Dec. 29, 1964   T. R. THOMAS   3,163,258
LUBRICATION
Filed Sept. 21, 1959

INVENTOR.
THOMAS R. THOMAS
BY
ATTORNEYS

3,163,258
LUBRICATION

Thomas R. Thomas, New York, N.Y., assignor to Auto Research Corporation, Boonton, N.J., a corporation of Delaware
Filed Sept. 21, 1959, Ser. No. 841,293
6 Claims. (Cl. 184—7)

The present invention relates to a lubricant distributing system and it particularly relates to a lubricating system designed to distribute lubricant in the form of a gas or air dispersion which lubricant is then subsequently condensed and supplied to various parts or places in or about a machine requiring predetermined amounts of lubricant.

It is among the objects of the present invention to provide a centralized lubricant distributing system which will enable convenient transmission of a mist of lubricant to be conveyed through a conduit or piping distributing system to desired bearings or other points of application relatively remote from the source of a lubricant, at which places in and about the mechanism to be lubricated the lubricant mist will be solidified and then caused to flow to and be distributed upon the bearings or other parts of the mechanism to receive lubricant.

Another object is to provide a centralized branched distributing lubricating system in which the lubricant will be caused to flow through and to a plurality of flexible conduits to relatively remote places where lubricant may be readily condensed and then deposited upon bearings to be lubricated.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention to provide a centralized mist generation source which may be of the type of structure best shown in my copending application Serial No. 657,807 now Patent No. 2,954,846.

According to this device a lubricant mist is generated by the use of a venturi nozzle employing filtered air which is forced past a venturi tube arrangement and then caused to strike a plate so that the larger particles of the mist are deposited while the finer suspended particles are carried through the distributing system.

The present invention is particularly directed to the manner in which these fine particles are caused to be solidified and then deposited to the predetermined points of application.

According to the preferred form of the present invention, the solidifying fittings are provided with a tubular body having distended end portions for attachment to a bearing or to a conduit system respectively and with the employment of porous rigid members to receive and solidify the oil mist.

In the preferred form of the invention a plurality of sintered or compressed porous metal discs are utilized of varying density and porosity so that there is a decreasing porosity in the direction of flow through the fitting with a plurality of sintered porous metal discs being employed.

Particularly with oil mists varying from .0005 to .002", namely from 12.5 to 50 microns, it has been found most desirable to use porous metal discs the sizes of which will usually be less than the micron size of the mist which is to be filtered. These discs particularly when of increasing fineness of porosity in the direction toward the bearing or point of distribution or deposition, appear to be most satisfactory for filtration purposes, although they can be all of the same size.

The density, grade and length of the porous disc may conveniently be regulated to give a resistance value or rating of between 27 to 219 with an efficiency of solidification varying from 90 to 95%.

To assure a satisfactory seal around the periphery of the discs when they are used in the form of a pile of two to eight or ten discs in a fitting, a neoprene rubber material or a plurality of tubes of such material are sandwiched between the fitting hole and the discs.

Normally, in assembly the best procedure is to freeze or chill the discs to a very low temperature of the order of —25 to —50° F. and then to insert them inside of the rubber tubes so that upon expansion they will tightly fit the tube and tend to extend the rubber tube or tubes against the interior wall of the fitting.

This structure produces a leak-tight fit with the bonded metal discs then achieving the desired filtration.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
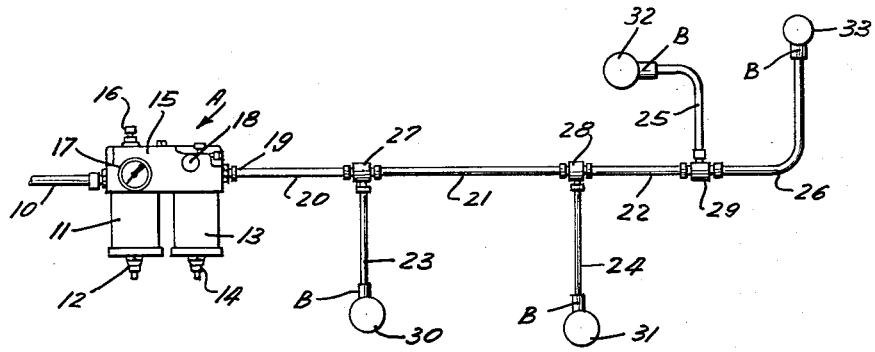
FIGURE 1 is a diagrammataic layout of a distributing system.

Referring to FIGURE 1, there is shown a lubricant pressure mist source A of the type more fully described in my copending application Serial No. 657,775, now Patent No. 2,954,844.

The lubricant pressure mist source has a compressed air inlet 10, a compressed air cylindrical filter receptacle 11 with a bottom relief member 12, a cylindrical lubricant filtering reservoir 13 with a relief outlet 14. Both of these cylindrical structures 11 and 13 are mounted in the head 15 which has an adjustment member 16, a gauge 17, a sight window 18 and a mist outlet 19.

The mist is distributed through the tubing system 20, 21 and 22 into the branches 23, 24, 25 and 26, past the junctions 27, 28 and 29 to suitable bearings or other members to receive lubricant at 30, 31, 32 and 33.

The bearings 30, 31, 32 and 33 are at different elevations and at different distances from the source A.

Figure 2:
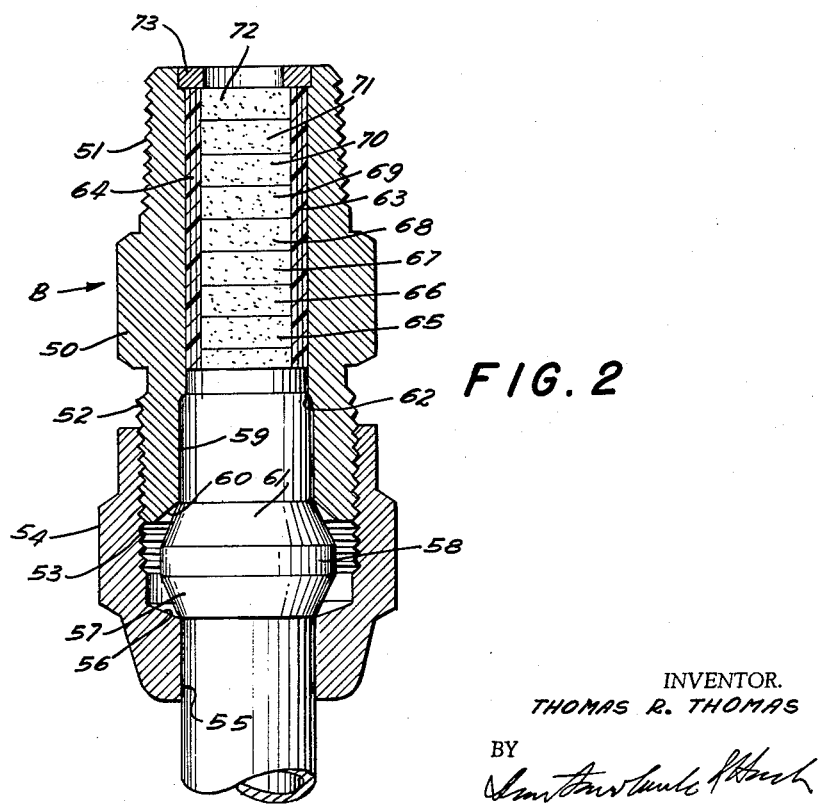
FIGURE 2 is a longitudinal sectional view through a typical outlet fitting according to the preferred embodiment of the present invention.

At each terminal of each branch 23, 24, 25 and 26 there will be a fitting B for condensation and metering purposes of the typical cross-section indicated in FIG. 2.

Referring to the metering fitting B, as shown in FIG. 2, there is a body 50 having the pipe threaded outlet 51 to be tightly threaded into a bearing or receiver structure such as indicated at 30, 31, 32 and 33.

At the inlet end there is a machine threaded portion 52 onto which the interior thread 53 of the coupling nut 54 is engaged.

The coupling nut has a central opening 55 to receive the inlet tubing 23, 24, 25 and 26 and it has a shoulder 56 which will crimp the tapered end 57 of the double tapered compression coupling sleeve 58 around the tubing.

The inlet end of the fitting B has an inlet socket 59 and a beveled shoulder 60 which forms a seat for the other tapered end 61 of the compression coupling sleeve 58 also deforming it inwardly around the inlet tubing.

The inlet tubing will be stopped by the shoulder 62 at the end of the socket 59.

The main bore or receiver portion 63 of the body 50 is designed to receive a plurality or a single rubber tube 64 which may desirably be of a synthetic rubber material resistant to lubricant, as neoprene, to give a peripheral seal. Within this rubber tubing there are positioned a plurality of discs 65, 66, 67, 68, 69, 70, 71 and 72.

These discs are desirably of a compressed sintered metal material such as bronze or even nickel or nickel alloys and if desired, the porosity may decrease from about the micron size of the large particles in the disc 65 until about ½ the micron size of the finest particles in the final disc 72.

This porosity is formed by pasasgeways ranging from the micron size of the large particles to one-half the micron size of the finest particles.

However, most desirably the discs may all be of the same porosity with the finest of passages being about midway or toward the finest micron size of the mist which is passed into the tubing at 19 from the source A. These discs preferably are frozen before being inserted into the tubing so that they will be of small size and then the end of the passageway 63 is closed by means of the insert 73.

Desirably the discs when made of the above porosity will accurately filter out the preferred oil mist, filtered to an efficiency of 90–95%, and varies from 12.5 to 50 microns, namely from .0005 to .002. After this condensation takes place the mist, solidified to oil droplets, will seep out into the bearings, giving the desired lubricating effect.

The term solidification or solidifying as used in the specification and claims describes the unusual procedure where the fine mist of liquid lubricant of 12.5 to 50 microns in size is converted into what appears to be small solid ovular or spherical particles which later liquefy and become liquid upon deposition on a metal surface to be lubricated.

By varying the number of discs or the density it is possible to control the distribution at each bearing with the larger number of discs giving a smaller discharge as is also true of the discs of increased fineness or decreased porosity. It is also possible to use a single disc or cylinder of desired length and size to give a predetermined metering effect. The larger the disc or cylinder and the smaller the diameter, the less mist that is solidified to droplets.

It is apparent that the applicant has designed a novel solidifying fitting useful for controlling the discharge from a mist lubrication system in and around the bearings to be lubricated.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. In a mist distributing system of the type having a central source feeding a suspension of fine oil particles in air into a branched distributing system having passageways leading to spaced and distributed bearings to be lubricated, an outlet solidification and condensation fitting to proportion and measure the amount of lubricant fed to each bearing and to transmit the lubricant in the form of droplets to each respective bearing comprising a threaded elongated body with a threaded end portion and a central passageway therethrough from the inlet to the outlet, a sintered porous metal cylindrical unit, having a greater length than diameter substantially the same as said passageway blocking said passageway and means sealing the space between the unit and the passageway to prevent the particles from by-passing the unit, said unit serving to convert the fine oil particles to droplets and remove them from the air and the mist, said mist carrying particles varying from 12.5 to 50 microns and said unit having passageways which are less in size than the micron size of the mist, the fine passageways in said unit being about one-half the size of the size of the finest oil particles, said unit being formed of particles of bronze sintered together to form a unitary mass.

2. In a lubricant distributing system of the type having a central source feeding a suspension of fine oil particles in air into a branched distributing system having passageways leading to spaced and distributed bearings to be lubricated, an outlet solidification and condensation fitting to proportion and measure the amount of lubricant fed to each bearing and to transmit the lubricant in the form of droplets to each respective bearing comprising an elongated outlet fitting body with a central passageway extending therethrough between the inlet to the outlet, a sintered porous metal cylindrical unit, having a diameter substantially the same as said passageway and blocking said passageway and the space between the unit and the passageway being sealed to prevent the particles from by-passing the unit, said unit serving to convert the fine oil particles to droplets and remove them from the air and the mist, said mist carrying particles ranging from 12.5 to 50 microns and said unit having passageways which are less in size than the micron size of the mist, the fine passageways in said unit being about one-half the size of the size of the finest oil particles, said unit being formed of particles of metal sintered together to form a unitary mass.

3. A lubricant distribution system for a plurality of spaced and distributed bearings of a mechanism located at different distances and heights of the type having a central source feeding under pressure a suspension of finely divided oil particles in the form of a mist with particles of sizes ranging from 12.5 to 50 microns into a branched distributing tubing system having unrestricted bores and having outlets to the bearings to proportion and control the distribution of the mist at different distances from the source and at different heights; the combination therewith of fittings one at each outlet, each fitting having a body with threaded ends and a central passageway of about the same diameter as said bores and at least one porous compressed sintered metal particle disc through which said mist is caused to pass, said sintered metal disc being sealed at its periphery to the wall of said central passageway, said disc being provided with small passages therethrough having a size within the range of the size of the oil particles to one-half the size of the oil particles and said disc condensing the mist into droplets which seep upon and into the bearing.

4. The system of claim 3, a plurality of said discs being provided in each fitting of decreasing porosity from the inlet to the outlet of the fitting and the height of the discs being greater than the diameter.

5. The system of claim 3, a sealing sleeve forming the seal around the periphery of the sintered metal disc.

6. In a mist distributing system of the type having a central source feeding a suspension of fine oil particles in air into a branched distributing system having passageways leading to spaced and distributed bearings to be lubricated, an outlet solidification and condensation fitting to proportion and measure the amount of lubricant fed to each bearing to transmit the lubricant in the form of droplets to each respective bearing comprising a threaded elongated body with a threaded end portion and a central passageway therethrough from the inlet to the outlet, a sintered porous bronze metal cylindrical unit, having a diameter substantially the same as said passageway blocking said central passageway and means sealing the space between the unit and the passageway to prevent the particles from by-passing the unit, said unit serving to convert the fine oil particles to droplets and remove them from the air and the mist, said mist carrying particles varying from 12.5 to 50 microns and said unit having passageways which are less in size than the micron size of the mist.

(References on following page)

References Cited in the file of this patent

UNITED STATES PATENTS

| | | |
|---|---|---|
| 1,701,154 | Gunn | Feb. 5, 1929 |
| 1,732,579 | Gleason | Oct. 22, 1929 |
| 1,947,586 | Fletcher | Feb. 20, 1934 |
| 2,251,964 | Stackhouse | Aug. 12, 1941 |
| 2,361,855 | McCormack | Oct. 31, 1944 |
| 2,604,958 | Leufvenius | July 29, 1952 |
| 2,642,156 | Gothberg et al. | June 16, 1953 |
| 2,682,315 | Evans | June 29, 1954 |
| 2,745,513 | Massey | May 15, 1956 |
| 2,772,750 | Bystricky | Dec. 4, 1956 |
| 2,852,095 | De Coriolis | Sept. 16, 1958 |
| 2,947,383 | Schytil et al. | Aug. 2, 1960 |

FOREIGN PATENTS

| | | |
|---|---|---|
| 756,336 | Great Britain | Sept. 5, 1956 |